(12) United States Patent
Hsieh et al.

(10) Patent No.: US 12,468,667 B1
(45) Date of Patent: Nov. 11, 2025

(54) TIME RESERVATIONS FOR ENSURING CONSISTENT READS IN A DISTRIBUTED DATABASE WITHOUT LOGGING

(71) Applicant: Google LLC, Mountain View, CA (US)

(72) Inventors: Wilson Cheng-Yi Hsieh, Syosset, NY (US); Eric Hugh Veach, Bellevue, WA (US); Michael James Boyer Epstein, Brooklyn, NY (US); Alexander Lloyd, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/643,449

(22) Filed: Apr. 23, 2024

Related U.S. Application Data

(60) Continuation of application No. 17/965,212, filed on Oct. 13, 2022, now Pat. No. 12,007,956, which is a
(Continued)

(51) Int. Cl.
| | |
|---|---|
| *G06F 17/00* | (2019.01) |
| *G06F 16/20* | (2019.01) |
| *G06F 16/23* | (2019.01) |
| *G06F 16/27* | (2019.01) |
| *G06F 16/951* | (2019.01) |
| *H04L 69/04* | (2022.01) |

(52) U.S. Cl.
CPC .......... *G06F 16/20* (2019.01); *G06F 16/2322* (2019.01); *G06F 16/2343* (2019.01); *G06F 16/27* (2019.01); *G06F 16/273* (2019.01); *G06F 16/951* (2019.01); *H04L 69/04* (2013.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | |
|---|---|---|
| 4,941,082 A | 7/1990 | Pailthorp et al. |
| 5,917,998 A | 6/1999 | Cabrera et al. |
| (Continued) | | |

OTHER PUBLICATIONS

Thomson, Alexander, et al., The Case for Determinism in Database Systems, Proceedings of the VLDB Endowment, vol. 3, No. 1, 2010 (11 pgs).

*Primary Examiner* — Hung D Le
(74) *Attorney, Agent, or Firm* — Lerner David LLP

(57) ABSTRACT

The subject matter described herein provides techniques to ensure that queries of a distributed database observe a consistent read of the database without locking or logging. In this regard, next-write timestamps uniquely identify a set of write transactions whose updates can be observed by reads. By publishing the next-write timestamps from within an extendable time lease and tracking a "safe timestamp," the database queries can be executed without logging read operations or blocking future write transactions, and clients issuing the queries at the "safe timestamp" observe a consistent view of the database as it exists on or before that timestamp. Aspects of this disclosure also provide for extensions, done cheaply and without the need for logging, to the range of timestamps at which read transactions can be executed.

20 Claims, 6 Drawing Sheets

Related U.S. Application Data continuation of application No. 16/992,602, filed on Aug. 13, 2020, now Pat. No. 11,520,753, which is a continuation of application No. 15/631,646, filed on Jun. 23, 2017, now Pat. No. 10,783,133, which is a division of application No. 13/661,913, filed on Oct. 26, 2012, now Pat. No. 10,037,346.

(60) Provisional application No. 61/675,556, filed on Jul. 25, 2012.

(56) References Cited

U.S. PATENT DOCUMENTS

| | | | |
|---|---|---|---|
| 5,937,413 | A | 8/1999 | Hyun et al. |
| 6,157,957 | A | 12/2000 | Berthaud |
| 6,457,016 | B1 | 9/2002 | Rohwer et al. |
| 7,266,698 | B2 | 9/2007 | Matsumoto et al. |
| 7,565,419 | B1 | 7/2009 | Kwiatkowski et al. |
| 7,568,080 | B2 | 7/2009 | Prahlad et al. |
| 7,761,421 | B2 | 7/2010 | Frolund et al. |
| 8,468,132 | B1 * | 6/2013 | O'Neill ............... G06F 16/27 707/622 |
| 8,789,208 | B1 * | 7/2014 | Sundaram ............ G06F 3/067 726/28 |
| 8,959,299 | B2 * | 2/2015 | Ngo .................. G06F 11/1469 711/E12.103 |
| 8,995,191 | B2 * | 3/2015 | Hold ................. G06F 11/1048 365/185.15 |
| 9,053,073 | B1 * | 6/2015 | Subramanian ...... G06F 11/2082 |
| 9,489,434 | B1 * | 11/2016 | Rath ..................... G06F 11/14 |
| 11,803,453 | B1 * | 10/2023 | Bunker ............... G06F 11/0751 |
| 12,219,510 | B2 * | 2/2025 | Sandberg ............. H04J 3/0658 |
| 2004/0148317 | A1 | 7/2004 | Sundararajan et al. |
| 2006/0041727 | A1 | 2/2006 | Adkins et al. |
| 2008/0071878 | A1 | 3/2008 | Reuter |
| 2008/0288577 | A1 | 11/2008 | Clubb et al. |
| 2009/0182783 | A1 | 7/2009 | Lomet |
| 2010/0077142 | A1 | 3/2010 | Fienblit et al. |
| 2010/0242092 | A1 | 9/2010 | Harris et al. |
| 2010/0260062 | A1 | 10/2010 | Senga et al. |
| 2010/0332513 | A1 | 12/2010 | Azar et al. |
| 2011/0055274 | A1 | 3/2011 | Scales et al. |
| 2011/0087458 | A1 | 4/2011 | Clementi et al. |
| 2012/0011398 | A1 | 1/2012 | Eckhardt et al. |
| 2012/0014377 | A1 | 1/2012 | Joergensen et al. |
| 2012/0081567 | A1 | 4/2012 | Cote et al. |
| 2012/0102006 | A1 | 4/2012 | Larson et al. |
| 2012/0124012 | A1 | 5/2012 | Provenzano et al. |
| 2012/0124013 | A1 | 5/2012 | Provenzano |
| 2012/0124046 | A1 | 5/2012 | Provenzano |
| 2013/0036091 | A1 * | 2/2013 | Provenzano .......... G06F 3/0619 707/624 |
| 2013/0111261 | A1 * | 5/2013 | Dalton ................ G06F 11/2028 714/E11.073 |
| 2015/0363124 | A1 * | 12/2015 | Rath ..................... H04L 67/51 709/219 |
| 2022/0019350 | A1 * | 1/2022 | Karr .................... G06F 3/0619 |
| 2022/0027051 | A1 * | 1/2022 | Kant ................... G06F 3/0617 |
| 2022/0091771 | A1 * | 3/2022 | Freilich ................ G06F 3/0604 |
| 2022/0156165 | A1 * | 5/2022 | Grunwald ............... G06F 3/061 |
| 2022/0229744 | A1 * | 7/2022 | Freilich ............... G06F 11/2097 |
| 2022/0334725 | A1 * | 10/2022 | Mertes .................. G06F 3/065 |
| 2023/0014785 | A1 * | 1/2023 | Karr .................... G06F 3/0655 |
| 2023/0083480 | A1 * | 3/2023 | Karumbunathan ... G06F 3/0626 709/216 |
| 2023/0088620 | A1 * | 3/2023 | Karumbunathan ..... G06F 3/065 |
| 2023/0350858 | A1 * | 11/2023 | Karr .................... G06F 3/064 |
| 2023/0353635 | A1 * | 11/2023 | Karumbunathan ......................... H04L 67/1097 |

* cited by examiner

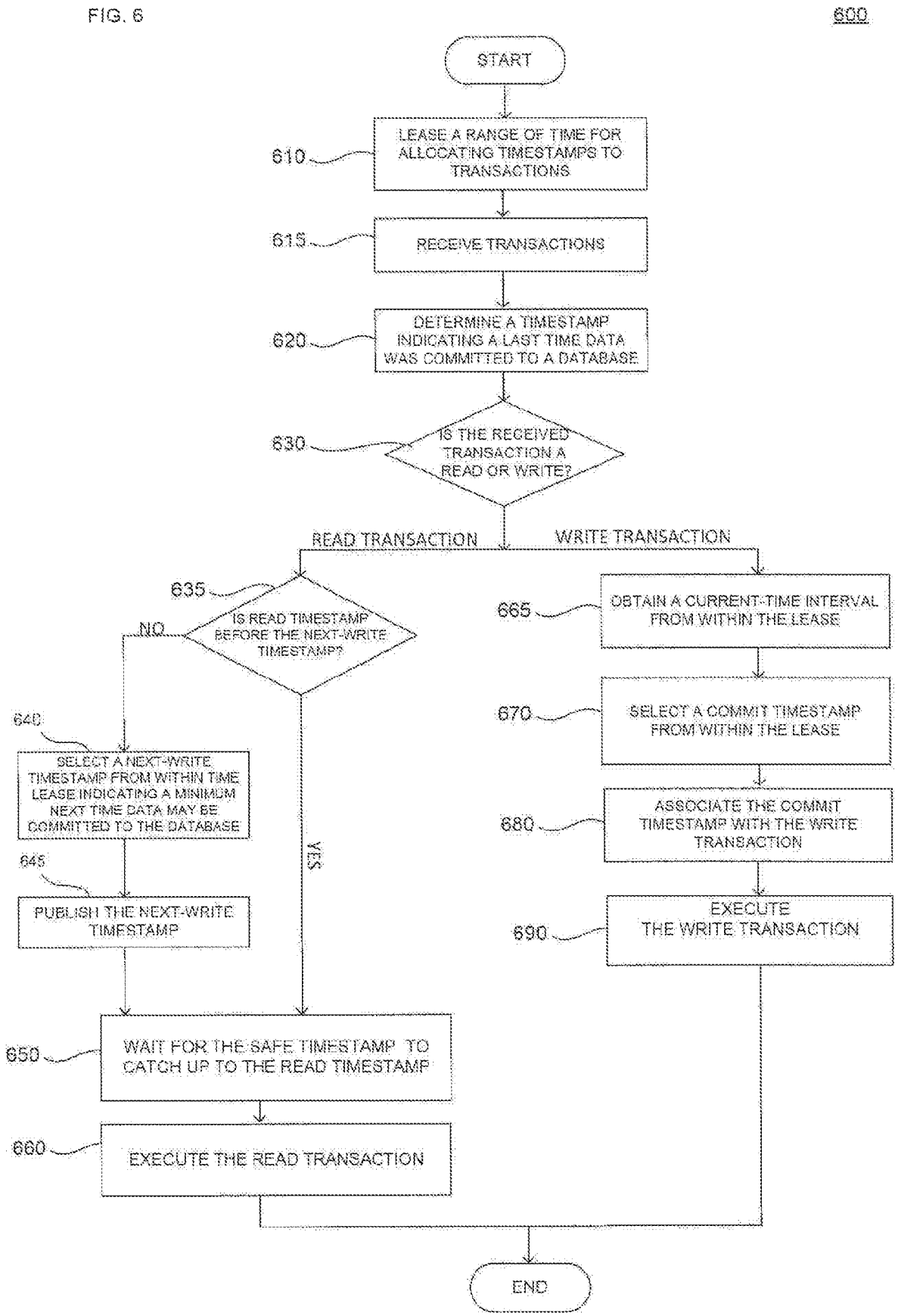

ns may be determined, for example, using a processor.
TIME RESERVATIONS FOR ENSURING CONSISTENT READS IN A DISTRIBUTED DATABASE WITHOUT LOGGING

CROSS-REFERENCE TO RELATED APPLICATIONS

The present application is a continuation of U.S. patent application Ser. No. 17/965,212, filed Oct. 13, 2022, which is a continuation of U.S. patent application Ser. No. 16/992, 602, filed Aug. 13, 2020, now U.S. Pat. No. 11,520,753, which is a continuation of U.S. patent application Ser. No. 15/631,646, filed Jun. 23, 2017, now U.S. Pat. No. 10,783, 133, which is a divisional of U.S. patent application Ser. No. 13/661,913, filed Oct. 26, 2012, now U.S. Pat. No. 10,037, 346, which claims the benefit of the filing date of U.S. Provisional Patent Application No. 61/675,556, filed Jul. 25, 2012, the disclosures of which are incorporated herein by reference.

BACKGROUND

In a distributed database, "shards" (e.g., selected table rows) of a database can be accessed in a number of read/write transactions, which are designed to move the database, as a whole, from one consistent state to another. Typically, database queries acquire a read lock that locks a database to ensure the shards stay in a consistent state until the queries are complete. However, this may tend to block the database for prolonged periods of time, potentially delaying write operations and causing write operations to delay other read operations.

BRIEF SUMMARY

Aspects of this disclosure may be advantageous for improving concurrency in a database system. The subject matter described herein may be useful in many applications, such as a global email system, database replication services, and in case of system failures. According to aspects, database systems may execute queries at snapshot timestamps to avoid acquiring a read lock that may block writes. When transaction timestamps are chosen in accordance with a causal ordering of write transactions, the snapshot queries issued by a client and executed at a timestamp are guaranteed to observe a consistent view of the database as it exists at that time. Replicas of shards of a replicated, distributed database can track a "safe timestamp," which is a timestamp at or below which read queries can safely execute. Such a timestamp must be smaller than the minimum timestamp that may be assigned to future writes (hereafter "next-write timestamp"). Executing a query that requires reading at a timestamp greater than or equal to the next-write timestamp may require that the next-write timestamp be advanced. To advance the next-write timestamp without persistently issuing log writes at a majority of replicas, this disclosure describes a technique in which a leader replica of a replicated database shard may reserve a range of timestamps for its exclusive use, and then extend that range of timestamps without logging. This disclosure additionally describes how timestamps may be drawn from that reserved timestamp range to advance the next-write timestamp, and thereby the "safe timestamp," also without logging.

One aspect of the present disclosure provides a method that may include sending an election request from a first replica to a plurality of replicas in a database at a first time. Responses affirming the election request may be received from a quorum of the plurality of replicas. A time lease during which the first replica can serve as leader for allocating timestamps from the time lease to incoming transactions may be determined, for example, using a processor. The time lease begins at the first time and ends a predetermined period of time later than the first time. The first time may correspond to a first current-time interval received from a global time service when the election request was sent. The method may also include sending a further request from the first replica to the plurality of replicas at a second time prior to an expiration of the time lease. When responses affirming the further request are received from a quorum of the plurality of replicas, the time lease during which the first replica can serve as leader may be extended. The extended time lease begins at the second time and ends at a predetermined period of time later than the second time.

In some aspects, each replica of the plurality of replicas that affirmed the election request maintains a lease vote time at which it affirmed the election request. It also assumes that the first replica started the time lease from a latest time it sent the response affirming the election request. According to aspects, the plurality of replicas do not log when extending the time lease. If one of the plurality of replicas which affirmed the election request crashes and restarts, that replica assumes the first replica started the time lease from a time that replica restarted.

In one aspect, to maintain the lease vote time the method further includes receiving a second current-time interval from the global time service and recording the lease vote time as a latest time from the second current-time interval. It may be determined whether the response affirming the election request has expired. In that regard, a subsequent current-time interval from the global time service may be retrieved. The method may further include determining when an earliest time from the subsequent current-time interval has passed a latest time from the second current-time interval by a predetermined lease duration.

Another aspect of the present disclosure provides a method that includes determining a lead replica from amongst a plurality of replicas in a database. A time lease may be reserved in which the lead replica can serve as leader, for example, using a processor. A number of transactions may be received in which the transactions include read transactions and write transactions. The method may include determining a last-write timestamp indicating a last time data was committed to the database may be determined, maintaining a next-write timestamp indicating a next time data may be committed to the database, and tracking a safe timestamp that is less than the next-write timestamp. In that regard, the next-write timestamp may be selected from within the time lease. The method may also include tracking a safe timestamp that is less than the next-write timestamp. According to aspects, if a given transaction from the received transactions is a write transaction, the method further includes selecting a commit timestamp from within the time lease that is greater than the next-write timestamp. The commit timestamp can be associated with the given write transaction, and the next-write timestamp can be increased to be greater than the commit timestamp. The given write transaction can be executed.

In some aspects, each received write transaction may be assigned a sequence number. The next-write timestamp may be associated with the sequence number assigned to the given write transaction. The safe timestamp may be advanced to the greater of the commit timestamp associated with the given write transaction and less than any next-write timestamp associated with the given write transaction's sequence number.

Yet another aspect of the present disclosure provides a method that may include using a processor to reserve, at a leader replica, a time lease in which the leader replica can serve as leader with respect to a plurality of non-leader replicas in a database. According to aspects, the method may include determining a last-write timestamp indicating a last time data was committed to the database and maintaining a next-write timestamp indicating a next time data may be committed to the database. At one or more of the plurality of replicas, a safe timestamp that is less than the next-write timestamp may be maintained. In some aspects, the next-write timestamp can be published to the plurality of non-leader replicas. The published next-write timestamp may be used to increase the safe timestamp.

A system, in accordance with the present disclosure may include a plurality of replicas in a database, which may include a first replica. In communication with the first replica, there may be one or more processors. The one or more processors are configured to send an election request to the plurality of replicas at a first time. The first time may correspond to a first current-time interval received from a global time service when the election request was sent. Responses affirming the election request may be received from a quorum of the plurality of replicas. A time lease during which the first replica can serve as leader for allocating timestamps from the time lease to incoming transactions may be determined. The time lease begins at the first time and ends a predetermined period of time later than the first time. The one or more processors may also be configured to send a further request from the first replica to the plurality of replicas at a second time prior to expiration of the time lease. When responses affirming the further request are received from a quorum of the plurality of replicas, the time lease during which the first replica can serve as leader may be extended. The extended time lease begins at the second time and ends at a predetermined period of time later than the second time.

Another system, in accordance with the present disclosure, may include a plurality of replicas, which may include a lead replica and one or more non-leader replicas. In communication with the plurality of replicas there may be one or more processors. The one or more processors are configured to reserve a time lease in which the lead replica can serve as leader. A number of transactions may be received in which the transactions include read transactions and write transactions. The one or more processors may also be configured to determine a last-write timestamp indicating a last time data was committed to the database, maintain a next-write timestamp indicating a next time data may be committed to the database, and track a safe timestamp that is less than the next-write timestamp. The next-write timestamp may be selected from within the time lease. According to aspects, if a given transaction from the received transactions is a write transaction, the one or more processors may be further configured to select a commit timestamp from within the time lease that is greater than the next-write timestamp. The commit timestamp may be associated with the given write transaction, and the next-write timestamp may be increased to be greater than the commit timestamp. The given write transaction can be executed.

BRIEF DESCRIPTION OF THE DRAWINGS

FIG. 6 is a flow diagram illustrating an example method of using a time lease in accordance with an aspect of the present disclosure.

DETAILED DESCRIPTION

Figure 1:
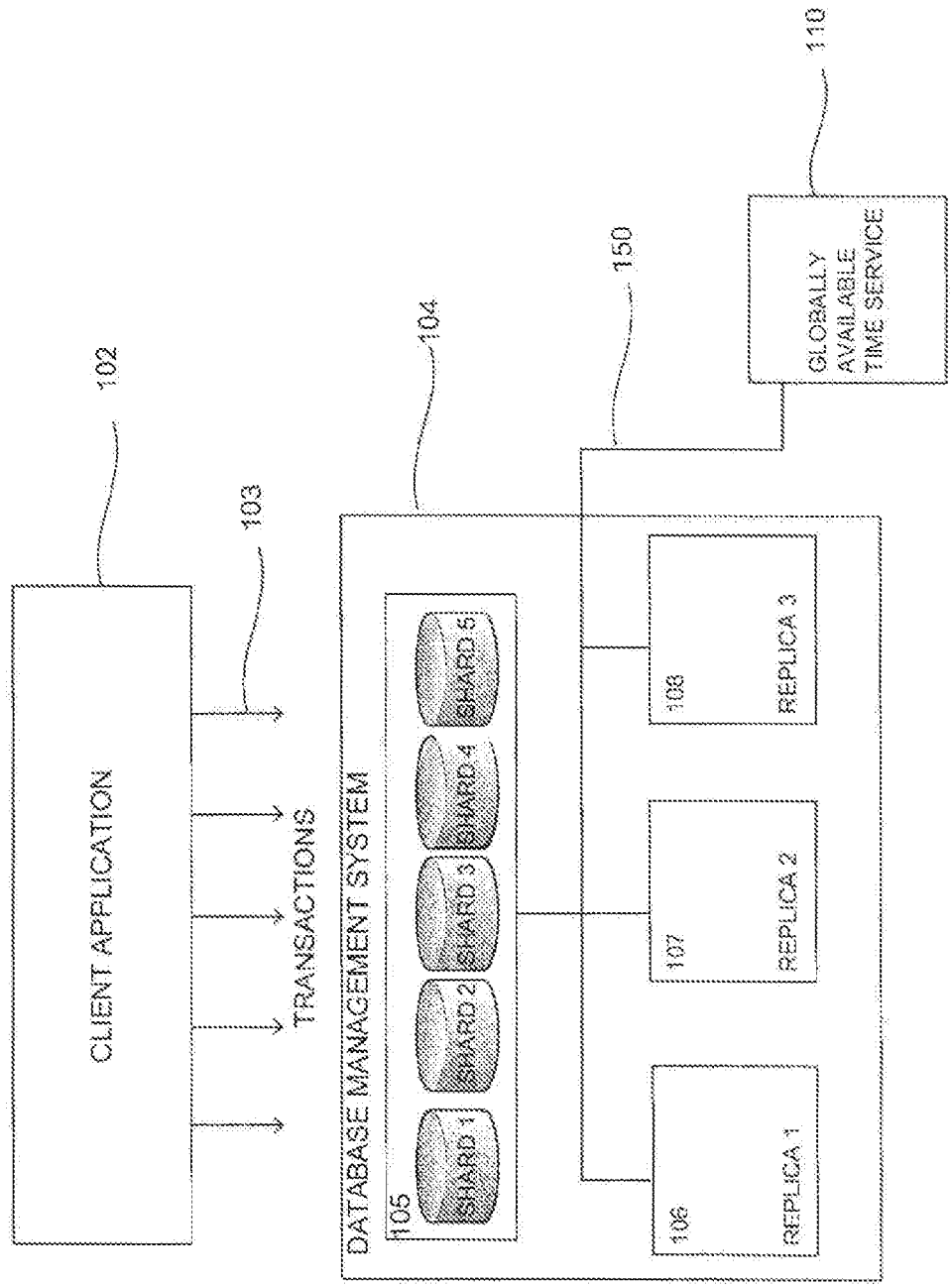
FIG. 1 is a diagram of a distributed database in accordance with an aspect of the present disclosure.

Aspects, features and advantages of this disclosure will be appreciated when considered with reference to the following description of embodiments and accompanying figures. It should be noted that the same reference numbers in different drawings may identify the same or similar elements. Furthermore, the following description is not limiting; the scope of the present technology is defined by the appended claims and equivalents.

In the present disclosure techniques are provided to ensure that database queries observe a consistent view of a distributed database without requiring read operations to be logged or obtain locks. By ensuring that the system performs all write transactions with an associated and causally increasing timestamp, it is possible to use a single timestamp to name a unique and consistent state of the database. In a database including a plurality of replicas, each replica may maintain a "safe timestamp" that can be an increasing timestamp at or below which it can correctly and consistently execute queries.

According to aspects, a replica can define a timestamp, referred to herein as a next-write timestamp, that represents a minimum next timestamp at which later write transactions may be committed. In some situations, the next-write timestamp can be published. A replica that may have knowledge of the published next-write timestamp can determine on its own a safe timestamp. For example, if a machine fails in which a database query is executing, it may be necessary to restart the query on a backup server. In this example, a replica running on the backup server that has knowledge of a published next-write timestamp can compute a safe timestamp and receive the timestamp at which the failed read was executing. Then, if the execution timestamp is less than or equal to the safe timestamp, it can determine that it is capable of executing the query. This assures that the query observes a consistent view of the data committed to database as of that execution timestamp.

Aspects of the disclosure may provide techniques to determine the next-write timestamp based on an extendable time lease. For example, a range of time may be reserved for allocating timestamps for both read and write transactions. From within this time lease, a next-write timestamp may be periodically published and may be used to update the safe timestamp. According to aspects, database reads are serialized to a time greater than a last timestamp assigned to a write transaction and less than the safe timestamp. In doing so, reads that may observe a consistent view of a database are protected from database updates without locking or logging. In some aspects, the time lease may be cheaply extended without further needing any operation to be logged. Thus, so long as the time lease has not expired, the next-write timestamp may be advanced periodically or on demand, which may allow consistent reads to be executed at increasing timestamps.

According to aspects, a transaction coordinator may reserve the time lease (e.g., a range of time) for assigning timestamps to incoming read and write transactions. The transaction coordinator may timestamp the transactions in a manner such that increasing timestamps reflect a causal dependency order of the transactions. This may be accomplished by ensuring that each incoming write transaction receives a timestamp that is greater than or equal to the time when it is received by the transaction coordinator, and that its effects are not made visible until after that selected timestamp is in the past. The waiting may preserve the causal order of events by ensuring that causal successors (e.g., dependent transactions) will be assigned respectively larger timestamps. An example of a distributed database that may be used to causally timestamp incoming transactions to preserve their causal order is further described below with respect to FIG. 1.

FIG. 1 is a diagram of a distributed database 101, as may be implemented in the example of a distributed database that may be used to causally timestamp incoming transactions. As shown in FIG. 1, the distributed database 101 may include a database management system 104 that includes a number of replicas 106, 107, 108 operating to maintain a consistent state of a database 105. Records of the database 105 may be replicated across database shards 1-5, for example, in order to distribute processing loads and provide a level of fault tolerance. The database management system 104 may accept a number of transaction requests 103 originating from a connected client application 102. From within the management system, a transaction coordinator may broadcast the transactions 103 to the group of replicas 106, 107, 108, which may be serving as listeners, by using a reliable communication layer 150, such as a network. In that regard, each replica may consist of a single machine or partitions of data (e.g., copy of a shard) that may be configured across multiple machines in one or more geographic locations.

A globally coherent timestamp may be assigned to the transactions indicating a universally known time that information is committed to the database. For example, the timestamp may be based on a time service that is available throughout a distributed system for providing a global representation of current time. In FIG. 1, for example, a globally available time service 110 is shown connected to the database management system 104. In one aspect, the database management system 104 may periodically query the time service 110 to determine a timestamp to associate with the incoming transaction requests 103. In some situations, the timestamps provided by the time service 110 may also be used for other purposes, including determining start and end times for leases, publishing next-write timestamps, and other purposes.

One approach to providing a globally coherent timestamp in a distributed system is with a reliable distributed time service. This type of service can be implemented in several ways. As one example, a worldwide optical network service may be used that regularly "ticks" for a set time interval (e.g., every millisecond) and updates a local counter at each tick. The timestamps based on this service may be globally consistent within a constant uncertainty (e.g., one millisecond) about the exact current time. As a second example of a reliable distributed time service, a number of time masters can be deployed throughout the distributed system to serve as a globally synchronized time service. The second example of distributed service is further described below with respects to FIGS. 2-3.

Figure 2:
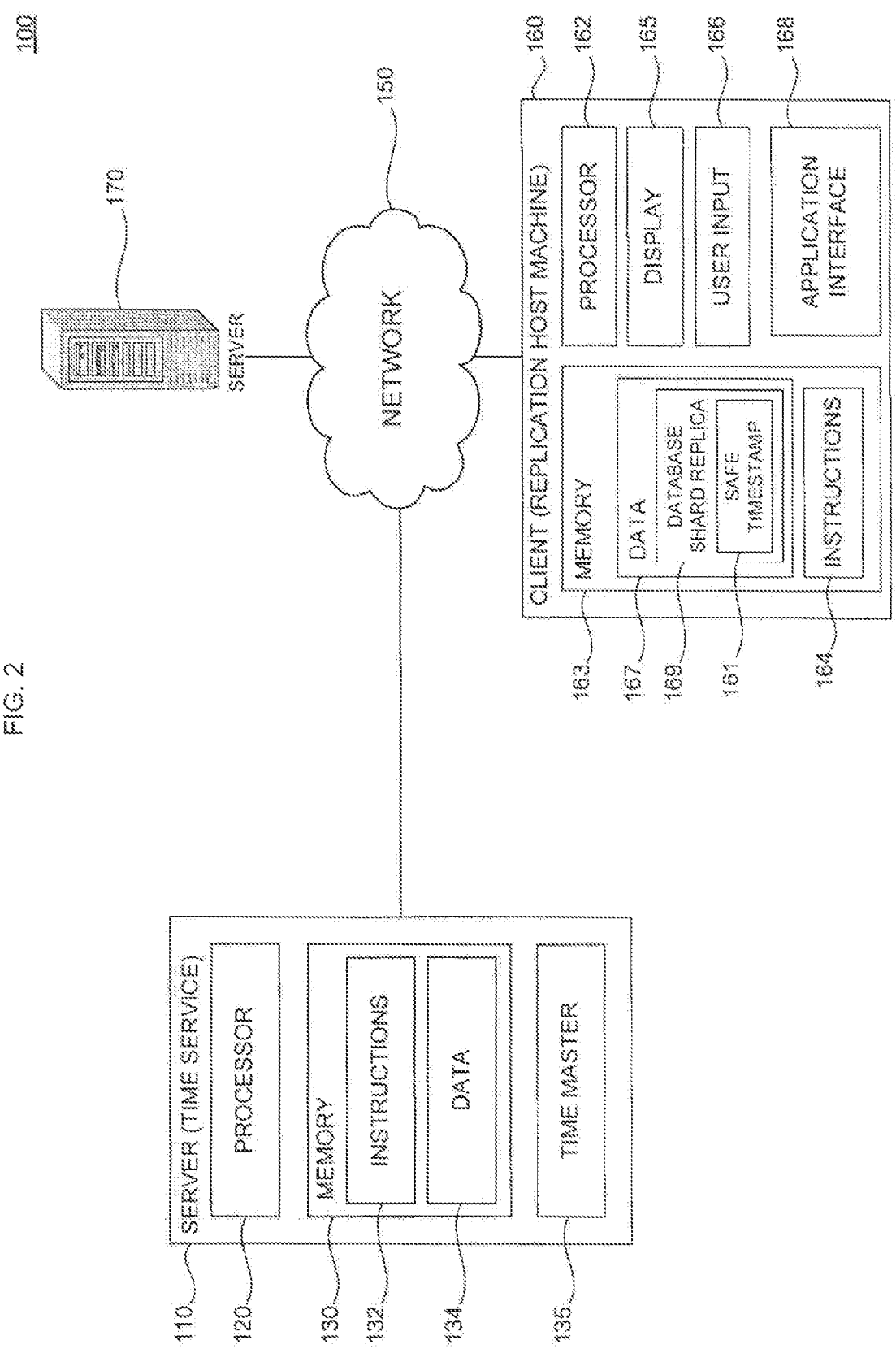
FIG. 2 is a diagram of a system in accordance with aspects of the present disclosure.

FIG. 2 is a diagram of a system 100, which describes the second example of a reliable distributed time service using globally deployed time masters. As shown, an example of system 100 may include a number of servers 110 and 170 coupled to a network 150. The system may also include a client 160 capable of wireless or wired communication with the servers 110 and 170 over the network 150.

A server 110 may contain a processor 120, memory 130, and other components typically present in general purpose computers. The memory 130 can store information accessible by the processor 120, including instructions 132 that can be executed by the processor 120. Memory can also include data 134 that can be retrieved, manipulated or stored by the processor 120. The memory 130 may be a type of non-transitory computer readable medium capable of storing information accessible by the processor 120, such as a hard-drive, memory card, ROM, RAM, DVD, CD-ROM, write-capable, and read-only memories. The processor 120 can be a well-known processor or other lesser-known types of processors. Alternatively, the processor 120 can be a dedicated controller such as an ASIC.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance. Functions, methods and routines of the instructions are explained in more detail below.

The data 134 can be retrieved, stored or modified by the processor 120 in accordance with the instructions 132. For instance, although the subject matter described herein is not limited by a particular data structure, the data 134 can be stored in computer registers, in a relational database as a table having a plurality of different fields and records, or XML documents. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that can be used by a function to calculate relevant data. For example, the data 134 can include time data that may be encoded based on the instructions 132 in a time format used to describe instants of time such as Coordinated Universal Time, Unix epoch and unambiguous International Atomic Time epoch.

Although FIG. 2 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel.

As shown in FIG. 2, servers 110 and 170 can also include a time master module 135. The time master module 135 may be operable in conjunction with a receiver for receiving time signals. Time masters 135 may serve as accurate time references in a distributed system for (1) synchronizing machines and devices and (2) validating and monitoring that synchronization. This can include serving a reference time to a core network of machines and their supporting infrastructure. For example, an incoming time query from a client 160 may receive a timestamp determined by the time master 135. The timestamps may be based on various types of systems known in the arts for providing an accurate and reliable time reference, such as a Global Positioning System (GPS).

According to aspects, servers 110 and 170 may consist of middleware software that can manage and integrate the time master module 135 with internal components of the servers 110 and 170. In one aspect, the middleware may consist of a set of services that allow multiple processes running from the time master module 135 to interact with the processor 120, memory 130, instructions 132 and data 134. In some aspects, it may be neither desirable nor possible to run other types of services on a host server 110 in conjunction with a time master module 135. For example, system conflicts can occur over ports assigned to other services severely impacting the time master's reliability.

Servers 110 and 170 may be at one node of network 150 and capable of directly and indirectly communicating with other nodes of the network 150. For example, the servers 110 and 170 can include a web server that may be capable of communicating with client device 160 via network 150 such that it uses the network 150 to transmit information to a client application. Servers 110 and 170 may also include a number of computers, e.g., a load balanced server farm, that exchange information with different nodes of the network 150 for the purpose of receiving, processing and transmitting data to client devices. In this instance, the client computers will typically still be at different nodes of the network 150 than the computers making up servers 110 and 170. Although only a few servers 110, 170 are depicted in FIG. 2, it should be appreciated that a typical system can include a large number of connected servers with each being at a different node of the network 150.

Each client 160 may be configured, similarly to servers 110 and 170, with a processor 162, memory 163, instructions 164, and data 167. Each client 160 may be a personal computer, intended for use by a person having all the internal components normally found in a personal computer such as a central processing unit (CPU), CD ROM, hard drive, and a display device 138, for example, a monitor having a screen, a projector, a touch-screen, a small LCD screen, a television, or another device such as an electrical device that can be operable to display information processed by the processor 162, speakers, a modem and/or network interface device, user input 137, such as a mouse, keyboard, touch screen or microphone, and all of the components used for connecting these elements to one another. Moreover, computers in accordance with the subject matter described herein may include devices capable of processing instructions and transmitting data to and from humans and other computers including general purpose computers, PDAs, network computers lacking local storage capability, set top boxes for televisions, and other networked devices.

The client 160 may include an application interface module 168. The application interface module may be used to access a service made available by a server, such as servers 110 and 170. For example, the application interface module may include sub-routines, data structures, object classes and other types of software components used to allow servers and clients to communicate with each other. In one aspect, the application interface module 168 may be a software module operable in conjunction with several types of operating systems known in the arts. For example, the client 160 may be connected to a Structured Query Language (SQL) database server that may operate in conjunction with the application interface module 168 for saving and retrieving information data. Memory 163 coupled to the client 160 may store data 167 accessed by the application module 168. The data 167 can also be stored on a removable medium such as a disk, tape, SD Card or CD-ROM, which can be connected to client 160.

As shown in FIG. 2, the client 160 may include a database shard replica 169. As previously discussed, records of a database system may be replicated to a database shard in order to, for example, distribute database processing loads. The database shard replica 169 may reside in memory 163 of the client 160. In some aspects, more than one database shard replica can reside in the memory 163 of a single client 160. The database shard replica 169 may include database software, such as a database application, and database records. The database records of the database shard replica 169 may be a subset of the records of a complete database system.

Each database shard replica 169 may include a "safe timestamp" 161 that may be encoded in various time formats used to describe instants of time, such as Coordinated Universal Time (UTC), UNIX epoch and International Atomic Time epoch (TAI). The safe timestamp 161 may identify a maximum timestamp at which a snapshot read of the database shard replica 169 can occur. For example, the safe timestamp 161 may identify a maximum read timestamp at which a set of transactions that updated the database shard replica 169 may be observed. Techniques for identifying a safe timestamp 161 are further described in more detail below.

Servers 110 and 170 and client 160 can be capable of direct and indirect communication such as over network 150. For example, using an Internet socket, the client 160 can connect to a service operating on remote servers 110 and 170 through an Internet protocol suite. Servers 110 and 170 can set up listening sockets that may accept an initiating connection for sending and receiving information.

The network 150, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.11, 802.12, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the servers and clients are not limited to a particular manner of transmission of information. Yet further, although some functions may be indicated as taking place on a single server having a single processor, various aspects of the subject matter described below may be implemented by a plurality of servers, for example, communicating information over network 150.

According to aspects, to ensure that the time masters are trustworthy, a subroutine, referred to herein as a time synchronization daemon, may be executed. Time synchronization daemons may be employed on one or a number of host machines simultaneously (e.g., client and time master host machines). By querying a fleet of globally deployed time masters to determine a current timestamp, the time synchronization daemons may periodically compare the host machine's approximation of time against the fleet of time masters. Once the fleet of time masters has been queried for the current time, the time synchronization daemon may track the round-trip query delay associated with querying each time master. In some aspects, the time synchronization daemon can calculate synchronization offset intervals that may be relative to each time master (e.g., an interval between local time and a time master's representation of current time).

To detect and reject offset intervals derived from possibly malfunctioning time masters (e.g., time masters that have failed but are still producing timestamps), a voting method may be used, such as a variant of Marzullo's algorithm. As a result of the voting method, the time synchronization daemon may accept output from validated time masters or reject output from certain time masters, for example, malfunctioning time masters.

Figure 3:
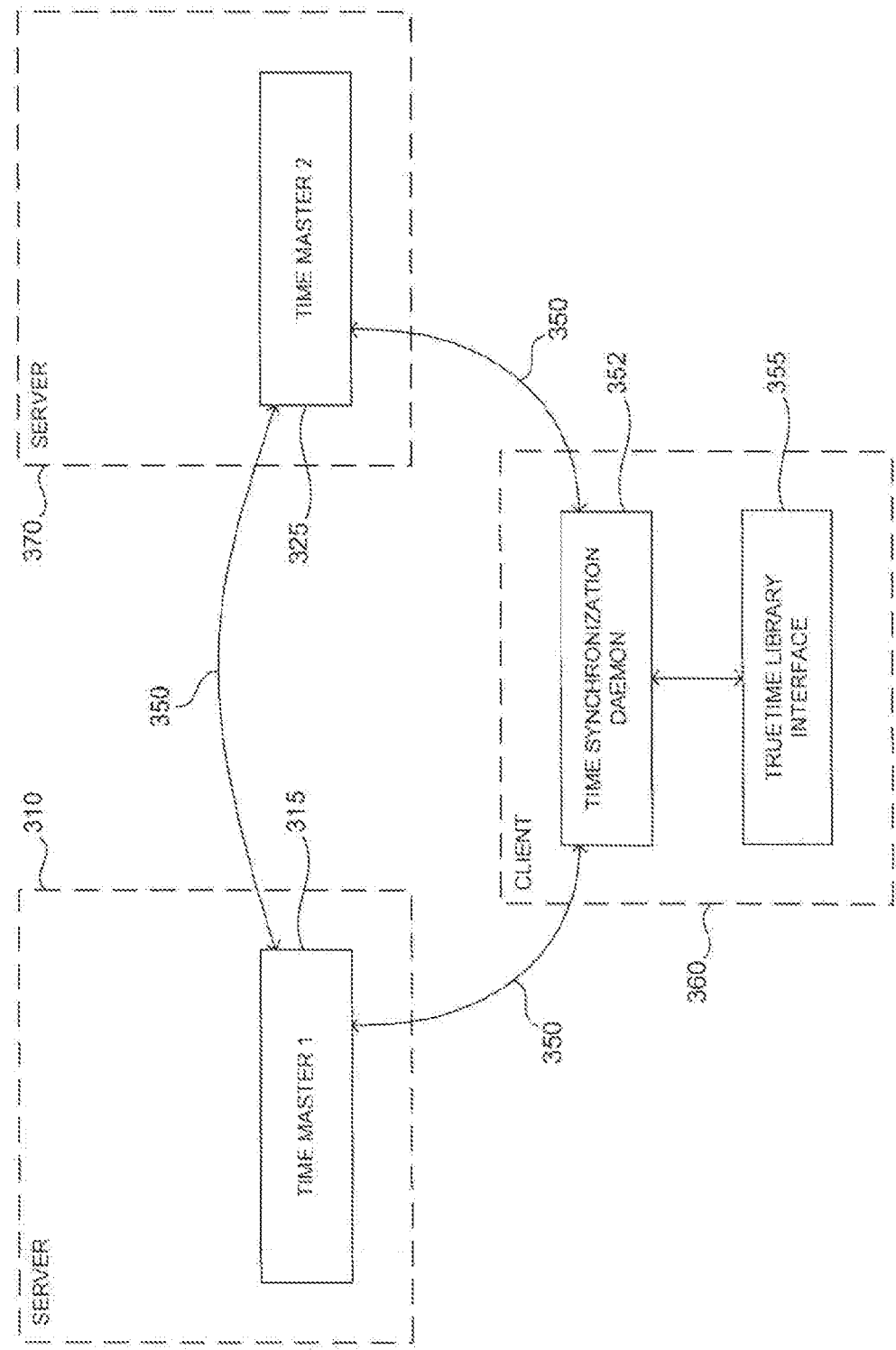
FIG. 3 is another diagram of a system in accordance with an aspect of the present disclosure.

FIG. 3 is another diagram of a system 300, which further describes the second example of a reliable distributed time service using globally deployed time masters. As shown, system 300 may include three types of modules: time masters 315 and 325 that may serve as a reliable time reference, a time synchronization daemon 352 that may synchronize local time by periodically querying multiple time masters, and a library interface 355 for providing to applications a current-time interval that contains the current true time. The three modules may be capable of direct and indirect communication over, e.g., a network connection 350. Each module may include middleware software that may manage and integrate the modules with host machines 310, 360 and 370, such as the servers and client described with respect to FIG. 2. Although only three types of modules are shown in FIG. 3, any number of modules may be included in the system 300 to provide reliable distributed time service.

According to aspects, time masters 315 and 325 may serve as primary time references in a distributed system. As previously discussed, the time masters' internal clocks may be synchronized with, e.g., a GPS signal, atomic clock or other types of accurate timekeeping technologies known in the arts. The time masters may be designed for high reliability and may be deployed at multiple sites throughout a distributed system. Although only two time masters are depicted in FIG. 3, the system 300 can include a large number of time masters communicating with each other, for example, over a network connection 350.

The time synchronization daemon 352 may periodically query multiple time masters 315 and 325 for a current timestamp. The daemons may calculate synchronization offset intervals relative to each time master 315 and 325 by tracking round-trip delays related to a time query. Sets of time master offsets may be validated against each other using, e.g., clock-synchronizing techniques as described with respect to FIG. 2. As previously discussed, the clock synchronizing techniques may employ an agreement algorithm to detect and reject offsets from malfunctioning time masters.

A library interface 355 may be employed to transmit validated current-time intervals to client applications. For example, a client may use an application programming interface (API) that may be operable in conjunction with the library in order to communicate with modules of system 300. The library may also calculate a local time offset interval (e.g., a difference between local time and a time reference) based on such factors as a local clock, known rate errors related to the local clock, and an offset interval determined by the time synchronization daemon 352 at the last time the time masters 315 and 325 were polled.

In some instances, the current-time intervals generated with the library can be used as a basis for making time information globally available to host machines in the distributed system. For example, processes associated with a distributed database may use this information to timestamp database transactions that may occur across different geographic locations. The width of the time interval returned by the library may represent a level of uncertainty about the exact current time, such as an uncertainty due to network transmission delays.

Figure 4:
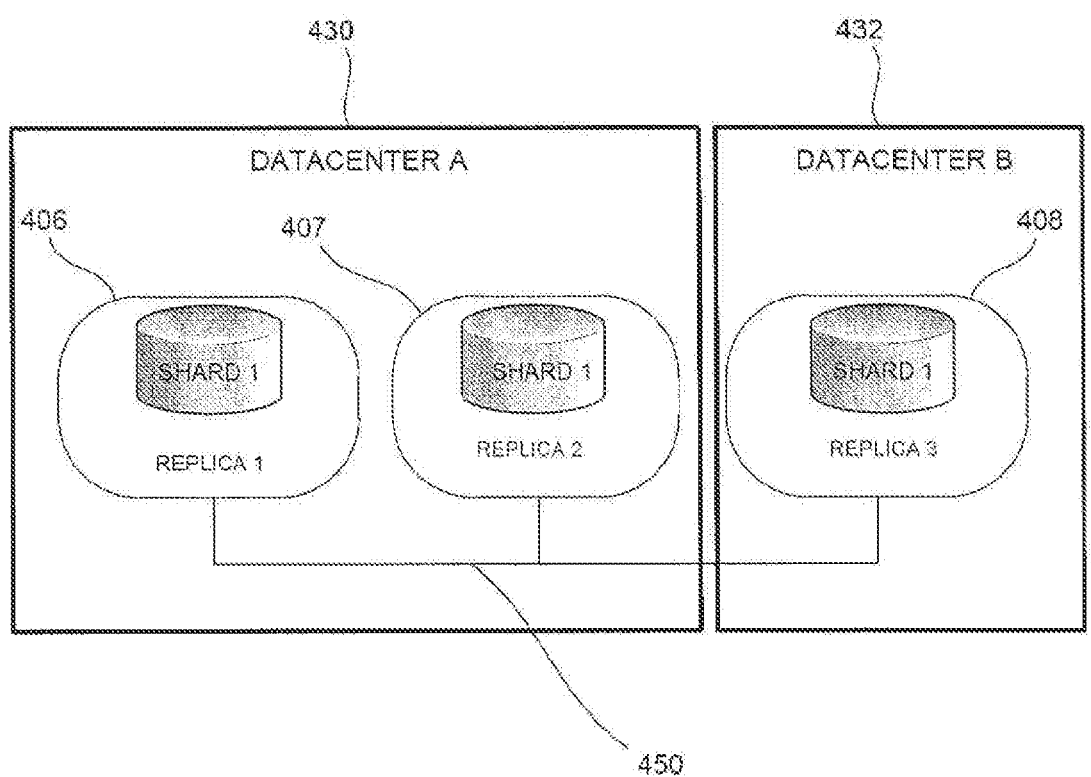
FIG. 4 is another example of the distributed database of FIG. 1 in accordance with an aspect of the present disclosure.

FIG. 4 is an example of the distributed database of FIG. 1 that can be used to add causal timestamps to transactions occurring across different geographic locations. In FIG. 4, portions of a complete database are shown within two datacenters 430 and 432. For example, shard 1 from the database of FIG. 1 may include records that are a subset of records found in the complete database. Typically, the complete database can contain an unlimited number of tables with rows, columns and fields. The fields can store multiple pieces of data, each associated with a different timestamp. In one aspect, a locally accessible time master may provide current time information for determining the timestamps.

The datacenters 430 and 432 can be stationed at locations around the globe. For example, datacenter 430 may be in New York, while datacenter 432 may be in London. The datacenters 430 and 432 may communicate via a network connection 450, for example, in order to send and receive information between resident computers. As shown in FIG. 4, each datacenter may contain a number of database processes, for example, replicas 406, 407 and 408. In this example, three replicas 406, 407, 408 of shard 1 are shown. Replication may be used both for availability and geographic locality of access. For example, replicas 406 and 407 in datacenter 430 may provide a redundant level of protection against system failures, while replica 408 may be remotely located in datacenter 432 to provide local access to the information stored in shard 1. In that regard, each of the replicas 406, 407, 408 may maintain a version of shard 1 at some point in time.

One replica may take on a lead role for ordering transactions with the others operating as listeners. For example, a replica in a lead role may be an organizer of a number of client requests for database writes. The replica in the lead role may order the requests and then forward them to several replicas, which may execute the writes on their local copy of shard 1. Some replicas may be ineligible to take on a lead role because of their capabilities. For example, a replica may be configured as read-only and cannot service writes.

In some instances, the "Leader" replica may be elected, for example, by an agreement of a majority of the replicas. Before the transactions have begun, the replicas may be unaware of which will serve as the "Leader," or coordinator, of the transactions. They may communicate with each other in order to decide which will take on the lead role. For example, an eligible replica can send out a "New Leader" request message to all replicas (including itself), which each may either accept or reject the request. If a quorum (e.g., over 50%) accept the request, then the requesting replica becomes a replication leader. After the replication leader is chosen, it may exclusively lease a range of time with the quorum of replicas that have accepted its leadership. Based on this time lease, the replication leader may associate timestamps with a number of database transactions that are received from the requesting clients.

The above described examples will now be explained with reference to example operations illustrated by the following flow diagrams. These operations do not have to be performed in the precise order described below. Rather, various steps may be handled in a different order or simultaneously. Steps may also be added or omitted unless otherwise stated.

Figure 5:
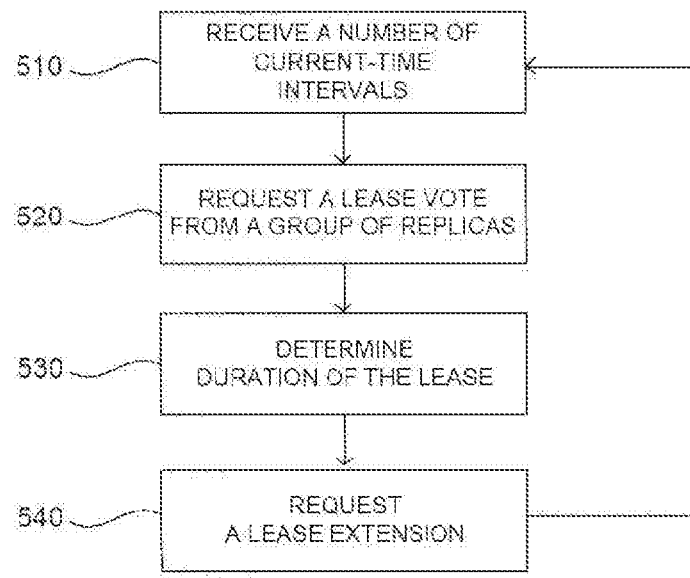
FIG. 5 is a flow diagram illustrating an example method of leasing a range of time in accordance with an aspect of the present disclosure.

FIG. 5 is a flow diagram illustrating an example method 500 of leasing a range of a time that may be used to allocate timestamps to incoming transactions. According to aspects, a replication leader may reserve a time lease for allocating timestamps for both read and write transactions. The replication leader may safely allocate timestamps for transactions from within the time lease because future leaders cannot reserve a time lease until after the replication leader's time lease expires. Such a later time lease will necessarily include numerical timestamps strictly greater than those that make up an earlier time lease.

In block 510, a current-time interval may be received, for example, by the replication leader. The current-time interval may be a time interval that includes a globally consistent representation of current time. As previously discussed, the replication leader may send a "New Leader" request to become leader to a group of replicas. Before sending each such request, the replication leader may request a current-time interval whose earliest point is known to predate the sending of that request. This interval may be retrieved by employing an instance of a library interface. For example, method 500 may operate in conjunction with the library interface described with respect to FIG. 3.

In block 520, the leader may send a message to each replica in the group requesting a "lease vote." If there is a conflicting lease vote already acknowledged by a replica, then it will reject the request. Otherwise, it will record in persistent storage a lease vote for the requesting leader's ID (e.g., a type of code that identifies the replication leader holding the lease), and then acknowledge the request to the requesting leader. According to aspects, the replica may retrieve a current-time interval and compute an expiration time of its lease vote that can be for a specific duration (for example, 10 seconds) later than the latest point in the current-time interval. When subsequently evaluating whether the lease vote has expired, each replica may obtain and use a new current-time interval. For example, the lease vote can expire if the entire current-time interval is later than the expiration time of the lease vote. If a quorum (e.g., a majority) of the replicas votes to accept the request, then a lease can be established for the leader. In some aspects, a lease request can be sent to the replicas along with other types of requests, such as a request for new write transactions to be executed.

In block 530, duration of the time lease may be determined. According to aspects, the leader may keep track of the most recent time after which a successful lease vote from each replica was requested. The replication leader may compute a beginning time of the lease based on the current-time interval associated with the quorumth-oldest successful lease vote request. For example, if there are three voting replicas, a quorum includes any two replicas. As such, the quorumth-oldest successful lease vote request is the second-oldest successful lease vote request. With five voting replicas, it would be the third-oldest, and so on. The beginning time of the lease may be set to an earliest time from the current-time interval from block 510 when the quorumth-oldest successful lease vote request was sent. As discussed, the lease vote request may have been sent out at the same time the replication leader made a "New Leader" request. From the earliest time in that current-time interval, a maximum lease duration value may be added to determine the time lease duration. For example, if a replica successfully became the replication leader as a result of a request sent at time 10.0, the current-time interval received in block 510 may be [9.9, 10.1], accounting for a level of uncertainty about the true current time on each side of the interval (e.g., 100 ms). In this example, time 9.9 is the earliest time of the interval. Thus, if the maximum lease duration value is 10 seconds, the replication leader computes that its lease will end at time 9.9+10=19.9.

In block 540, a lease extension may be requested. For example, the replication leader can send a lease extension request along with other types of requests, such as a request for new write transactions to be executed by the replicas. Alternatively, the extension request can be sent directly without another type of request, when the replication leader's lease is about to expire, or when the remaining time in the leader's lease is below a certain threshold. In this case, the replication leader may send a message on its own to the replicas requesting a lease extension. Each successful lease vote arising from a lease extension request will update that replica's lease vote information stored at the leader, which may be used by the leader to re-compute the quorumth-oldest successful lease vote time as described in block 530, and thereby potentially result in an extension to the leader's lease expiration time. It should be noted that so long as the leader's lease vote has not expired, replicas do not need to log anything in order to perform this lease extension vote.

In some aspects, lease extensions can continue to occur periodically. For example, a lease extension may be valid for 8-9 seconds, and then after that time as passed when the expiration draws near, another lease extension may be requested. Method 500 may repeat block 510 in order to calculate the lease extension from the current time the replication leader sent the quorumth-oldest successful extension request plus the lease duration value. For example, the replication leader may again retrieve a current-time interval for the current time when the lease vote request was sent, which at this time may be 19.0. In this example, the current-time interval may be [18.9, 19.1] given the same 100 ms uncertainty about the true current time. Here, the time lease extension will be until 18.9+10=28.9.

FIG. 6 is a flow diagram illustrating an example method 600 of using a time lease and safe timestamps to isolate database queries from future writes. For example, if a query is performed as of time T, which is less than the safe timestamp, then the query can see all changes that were committed to a database on or before T, and it cannot see changes that were committed to the database after T.

In block 610, a range of time may be leased. For example, a replication leader may reserve a time lease with a group of replicas utilizing method 500. According to aspects, a replication leader may hold the time lease with a majority of replicas to which the replication leader may service a number of read and write transactions.

In block 615, a number of database transactions may be received. For example, read or write transactions may be received to access or store data in the database. The transactions may originate from one or more database clients using an interface to transmit the transactions, such as an application program interface (API). For example, the API may allow clients to send transaction requests using a communication layer (e.g., network) to a database manager system for execution. The API may include software components, specifications for routines, data structures, object classes, and other variables as necessary for transmitting and receiving data. In one aspect, the transactions may be batched and stored in memory before being broadcasted together to other components of the database management system, such as a group of database replicas.

In block 620, a largest timestamp that was associated with a write transaction to the database (or some relevant portion of the database) may be determined. According to aspects, timestamps from within the time lease may be allocated to transactions that are executed, for example, by a replica. In some aspects, the last timestamp allocated to a write transaction that was committed to a database (or some relevant portion of a database) may be tracked and recorded. For example, the timestamp may be stored in the memory of a replica executing the transaction.

In block 630, it may be determined whether the transaction received in block 615 is a read or write transaction. For example, a read may be a transaction that includes instructions to retrieve information from the database, while a write transaction may be a transaction that includes instructions to commit information to a database. If it is determined that the transaction is a read, then method 600 may proceed to block 635. Otherwise, method 600 may proceed to block 665.

In block 665, the replication leader may obtain a current-time interval from within the lease. As previously discussed, the current-time interval may be a time interval that includes a globally consistent representation of current time. In this regard, the interval may be retrieved by employing an instance of a library interface. For example, method 600 may operate in conjunction with the library interface described with respect to FIG. 3.

In block 670, a commit timestamp from within the time lease may be selected, for example, by a replication leader. The commit timestamp may be greater than or equal to the next-write timestamp, as well as greater than the last commit timestamp from block 620, as well as greater than or equal to the maximum timestamp in the current-time interval selected in block 665. This timestamp may be verified to ensure that it falls within the time lease reserved in block 610.

In block 680, the commit timestamp selected in block 670 may be associated with the write transaction. For example, a replication leader may assign the commit timestamp to an incoming write transaction. The replication leader may then increase the next-write timestamp to be greater than the assigned commit timestamp. According to aspects, the write transactions in a given shard may also be assigned a unique sequence number. For example, the first new write transaction broadcasted to the replicas from the shard's replication leader may be assigned sequence 0, then the next 1, 2, 3 and so on.

In block 690, the write transaction may be executed. This may include transmitting the write to the replicas and receiving acknowledgement of the write transaction from a majority of voting replicas. In addition, a time lease extension may be requested, as part of this operation, by the replication leader. Although the replicas may receive writes in any order, they may not apply them out of order. For example, if writes 2, 0, 3, and then 1 are received in that order, 2 may not be applied when it is received. Instead, 2 may be buffered (e.g., stored in memory), and then 0 may be applied immediately upon being received. 3 may also be buffered upon being received, and when I is finally received the replicas may apply writes 1-3 in order. Any replica that has applied all writes through a given sequence number may advance its safe timestamp past the commit timestamps for the applied writes to enable it to safely process a snapshot read whose read timestamp is less than the given sequence number's assigned commit timestamp. Upon completion of the write transaction, method 600 may end, or may loop back to block 615 to receive more transactions.

In block 635, a read timestamp may be selected for the read transaction, if one was not already specified by the requesting client. This read timestamp may be determined based on a configurable amount of staleness before the current time, as derived from the time service, or may be determined to be equal to the timestamp of the last committed write transaction as determined in block 620, or by another method. It may be determined whether a timestamp requested for the read transaction to execute is before the next-write timestamp. If the read is for a time before the next-write timestamp, then method 600 may proceed to block 650. Otherwise, it may proceed to block 640.

In block 640, a next-write timestamp from within the time lease may be selected, for example, by a leader replica. According to aspects, a next-write timestamp associated with each replica may be tracked and stored, for example, it may be stored in a data structure in the memory of the replica. In some aspects, the next-write timestamp may be advanced to a time that represents current time. For example, method 600 may again retrieve a current-time interval that includes a globally consistent representation of current time. In some aspects, a timestamp from within the interval, such as the latest timestamp in the interval, may be assigned to the next-write timestamp.

In block 645, the next-write timestamp selected in block 640 may be associated with the maximum known sequence number, and may be published. For example, the next-write timestamp may be stored in a data structure in the memory of the leader replica, and both the sequence number and next-write timestamp may be subsequently transmitted together to other replicas of the leader's shard.

In block 650, a period of time may pass until a safe timestamp catches up to the read timestamp for the transaction. For example, a safe timestamp may be determined at the replica. According to aspects, the safe timestamp can be a maximum timestamp in which reads can observe a consistent view of a database. As previously discussed with respect to block 690, when a write transaction is applied, a replica may advance the safe timestamp to the greater of the timestamp associated with that transaction in block 670, and to one less than any next-write timestamp previously associated with that write transaction's sequence number. In some situations, certain pending operations, such as uncommitted distributed transactions, may temporarily restrain the advancing of the safe timestamp. As such, block 650 may wait until the computed safe timestamp equals or exceeds the timestamp for the read operation. This may include waiting for write transactions to be applied, as described in block 690.

In block 660, the read transaction can be executed at the read timestamp and data as of that timestamp may be returned to the requesting client. That is, data derived from write transactions whose timestamps were less than or equal to the read timestamp may be returned to the client.

It should be noted that many concurrent read and write transactions may be processed by a single replica, and that block 660 may proceed concurrently with block 670 where new writes are allocated timestamps because reads will access existing data in a database before the safe timestamp, and a new write will create a new version of the data with a timestamp that will be greater than the next time data may be committed to the database (e.g., the next-write timestamp).

In some situations, non-leader replicas may also be able to serve read transactions based on information from write transactions and next-write timestamps they have received from the leader. However, only leader replicas, which maintain time leases, are able to generate new next-write timestamps. A read transaction served by a non-leader replica may, therefore, require communication with the leader replica to request additional next-write timestamps.

For example, with continued reference to FIG. 6, if a non-leader replica is processing a read transaction request, it may check whether the read timestamp is before the next-write timestamp (block 635). If it is determined that the read timestamp is before the next-write timestamp, the non-leader replica may wait for a safe timestamp to catch up to read timestamp (block 650) and execute the read transaction (block 660). If it is determined that the read timestamp is not before the next-write timestamp, then instead of generating its own next-write timestamp (e.g., as described in blocks 640 and 645), the non-leader replica may send a request to the leader (e.g., via a type of remote procedure call) that the leader execute blocks 640 and 645 to provide the non-leader with a next-write timestamp. The non-leader may then proceed according to blocks 650, 660, as described above.

According to aspects, it may be advantageous for the leader to issue frequent next-write timestamps to replicas, to increase the likelihood that non-leader replicas that receive read transactions can proceed directly from block 635 to block 650 without having to communicate with the leader.

Although write transactions themselves are logged and applied, next-write timestamps may not be. This permits safe timestamps to be extended at both leader and non-leader replicas without further logging. The coterminosity (e.g., common boundary) of the leader's time lease and its delegated range of timestamps, and their association with actual time by virtue of the time service's guarantees, permit the leader to unilaterally provide a next-write timestamp without logging.

The above-described aspects of the present technology may be advantageous for ensuring that queries of a distributed database observe a consistent view of that database without locking or logging. By introducing techniques to publish a next-write timestamp based on an extendable time lease and to track a safe timestamp, and by using techniques to isolate queries from future writes, the database may permit both leader and non-leader replicas to efficiently handle users' read transactions without logging or locking. Using a distributed time service to compute the range of timestamps that lie within the time lease assures that the timestamps used bear a direct relationship to actual time and are unique across successive leader replicas. This technology may be useful in many applications, such as a global email system, database replication services, and in case of system failures. For example, by utilizing the techniques herein, if one database replica fails from a group of replicas, clients can continue to query an alternative replica by repeating a current read transaction at the same read timestamp. Moreover, clients issuing snapshot data reads to a group of replicas will receive a consistent observation of the data stored across the group.

As these and other variations and combinations of the features discussed above can be utilized without departing from the subject matter defined by the claims, the foregoing description of the examples should be taken by way of illustration rather than by way of limitation of the subject matter defined by the claims. It will also be understood that the provision of the examples disclosed herein (as well as clauses phrased as "such as," "including" and the like) should not be interpreted as limiting the claimed subject matter to the specific examples; rather, the examples are intended to illustrate only one of many possible implementations. Further, the same reference numbers in different drawings may identify the same or similar elements.

The invention claimed is:

1. A method, comprising:
   determining, using a processor, a duration of a time lease based on a first current-time interval;
   sending, using the processor, from a first replica, a request to extend the duration of the time lease to a plurality of replicas in a database at a first time prior to expiration of the time lease;
   receiving, using the processor, responses affirming the request from a quorum of the plurality of replicas prior to expiration of the time lease; and
   extending, using the processor, the duration of the time lease to be a predetermined period of time later than the first time.

2. The method of claim 1, further comprising:
   sending, using the processor, from the first replica, an election request to the plurality of replicas; and
   receiving, using the processor, responses affirming the election request from the quorum of the plurality of replicas.

3. The method of claim 2, wherein the election request is sent at a time corresponding to a current-time interval received from a global time service, the current-time interval comprising a globally consistent representation of current time accounting for a level of uncertainty about a current true time.

4. The method of claim 2, wherein each replica of the plurality of replicas maintains a lease vote time at which it affirmed the election request.

5. The method of claim 2, wherein sending the election request from the first replica to the plurality of replicas further comprises sending the election request along with a request for new write transactions to be executed.

6. The method of claim 1, wherein the time lease begins at an earliest point in the current-time interval and ends a predetermined period of time later than the earliest point.

7. The method of claim 1, wherein the first replica serves as a leader for allocating timestamps to incoming transactions during the time lease.

8. The method of claim 1, wherein the first replica serves as an organizer of a number of client requests for database writes during the time lease.

9. The method of claim 1, wherein the plurality of replicas do not log the extending of the time lease.

10. The method of claim 1, further comprising:
    determining, using the processor, a next-write timestamp based on the time lease, the next-write timestamp representing a next time at which data can be committed to the database; and
    publishing, using the processor, the next-write timestamp for use by one or more of the plurality of replicas in determining whether the one or more replicas can execute a transaction while maintaining a consistent view of the database among the plurality of replicas.

11. A system comprising:
    a database; and
    one or more processors in communication with the database, the one or more processors being configured to:
    determine a duration of a time lease based on a first current-time interval;

send, from a first replica, a request to extend the duration of the time lease to a plurality of replicas in the database at a first time prior to expiration of the time lease;

receive responses affirming the request from a quorum of the plurality of replicas prior to expiration of the time lease; and extend the duration of the time lease to be a predetermined period of time later than the first time.

12. The system of claim 11, wherein the processors are further configured to:

send, from the first replica, an election request to the plurality of replicas; and receive responses affirming the election request from the quorum of the plurality of replicas.

13. The system of claim 12, wherein the election request is sent at a time corresponding to a current-time interval received from a global time service, the current-time interval comprising a globally consistent representation of current time accounting for a level of uncertainty about a current true time.

14. The system of claim 12, wherein each replica of the plurality of replicas maintains a lease vote time at which it affirmed the election request.

15. The system of claim 12, wherein sending the election request from the first replica to the plurality of replicas further comprises sending the election request along with a request for new write transactions to be executed.

16. The system of claim 11, wherein the time lease begins at an earliest point in the current-time interval and ends a predetermined period of time later than the earliest point.

17. The system of claim 11, wherein the first replica serves as a leader for allocating timestamps to incoming transactions during the time lease.

18. The system of claim 11, wherein the first replica serves as an organizer of a number of client requests for database writes during the time lease.

19. The system of claim 11, wherein the processors are further configured to:

determine a next-write timestamp based on the time lease, the next-write timestamp representing a next time at which data can be committed to the database; and publish the next-write timestamp for use by one or more of the plurality of replicas in determining whether the one or more replicas can execute a transaction while maintaining a consistent view of the database among the plurality of replicas.

20. A non-transitory computer readable medium for storing instructions that, when executed by one or more processors, cause the one or more processors to perform operations comprising:

determine a duration of a time lease based on a first current-time interval;

send, from a first replica, a request to extend the duration of the time lease to a plurality of replicas in a database at a first time prior to expiration of the time lease;

receive responses affirming the request from a quorum of the plurality of replicas prior to expiration of the time lease; and extend the duration of the time lease to be a predetermined period of time later than the first time.

* * * * *